United States Patent [19]

Panicci et al.

[11] Patent Number: 5,579,225

[45] Date of Patent: Nov. 26, 1996

[54] METHOD OF GENERATING AN OUTPUT SIGNAL REPRESENTING VEHICLE SPEED AND INDICATING SAME

[75] Inventors: Anthony V. Panicci, Royal Oak; Edward R. Hanish, Livonia, both of Mich.

[73] Assignee: Chrysler Corporation, Auburn Hills, Mich.

[21] Appl. No.: 425,328

[22] Filed: Apr. 17, 1995

Related U.S. Application Data

[63] Continuation of Ser. No. 62,371, May 14, 1993, abandoned.

[51] Int. Cl.[6] ............................................. G06G 7/70
[52] U.S. Cl. ........................ 364/424.1; 364/424.01; 364/426.04; 364/565; 477/155; 475/285; 324/160; 324/166; 324/171; 377/30; 340/815.87
[58] Field of Search ................................. 324/160, 166, 324/170; 477/155; 340/815.87; 377/30

[56] References Cited

U.S. PATENT DOCUMENTS

| | | | |
|---|---|---|---|
| 4,803,646 | 2/1989 | Burke et al. | 364/461 |
| 4,875,391 | 10/1989 | Leising et al. | 74/866 |
| 4,930,094 | 5/1990 | Luitje et al. | 364/461 |
| 5,020,008 | 5/1991 | Chambers et al. | 364/561 |
| 5,103,413 | 4/1992 | Ohata | 364/565 |
| 5,267,916 | 12/1993 | Beim et al. | 475/285 |

OTHER PUBLICATIONS

Adaptive Control Strategies for Clutch–to–Cluch Shifting, Fisita '90, #905048, Leising, Holbrook, Benford of Chrysler Corp. Jan. 1990.

The All–Adaptive Controls for the Chrysler Ultradrive Transaxle, #890529, Leising, Benford and Holbrook of Chrysler Corp. May 1989.

DRB II Operator's Manual, Chrysler Motors, Revised Jul. 1989.

The Chrysler A–604 Ultradrive 4–Speed Automatic Transaxle, Martin and Nogle of Chrysler Corp., #890528 May 1989.

The 1989 A–604 Ultradrive Four–Speed Automatic Transaxle–Part Two "Inside the A–604", *Master Tech 88*, Aug. 1988.

*Primary Examiner*—Kevin J. Teska
*Assistant Examiner*—Jacques Louis-Jacques
*Attorney, Agent, or Firm*—Mark P. Calcaterra

[57] ABSTRACT

A method of selecting a pinion for a vehicle speedometer system uses a transmission output speed sensor and a transmission controller which applies a pinion factor to the signal from the sensor to generate an output signal representing the speed of the vehicle.

11 Claims, 5 Drawing Sheets

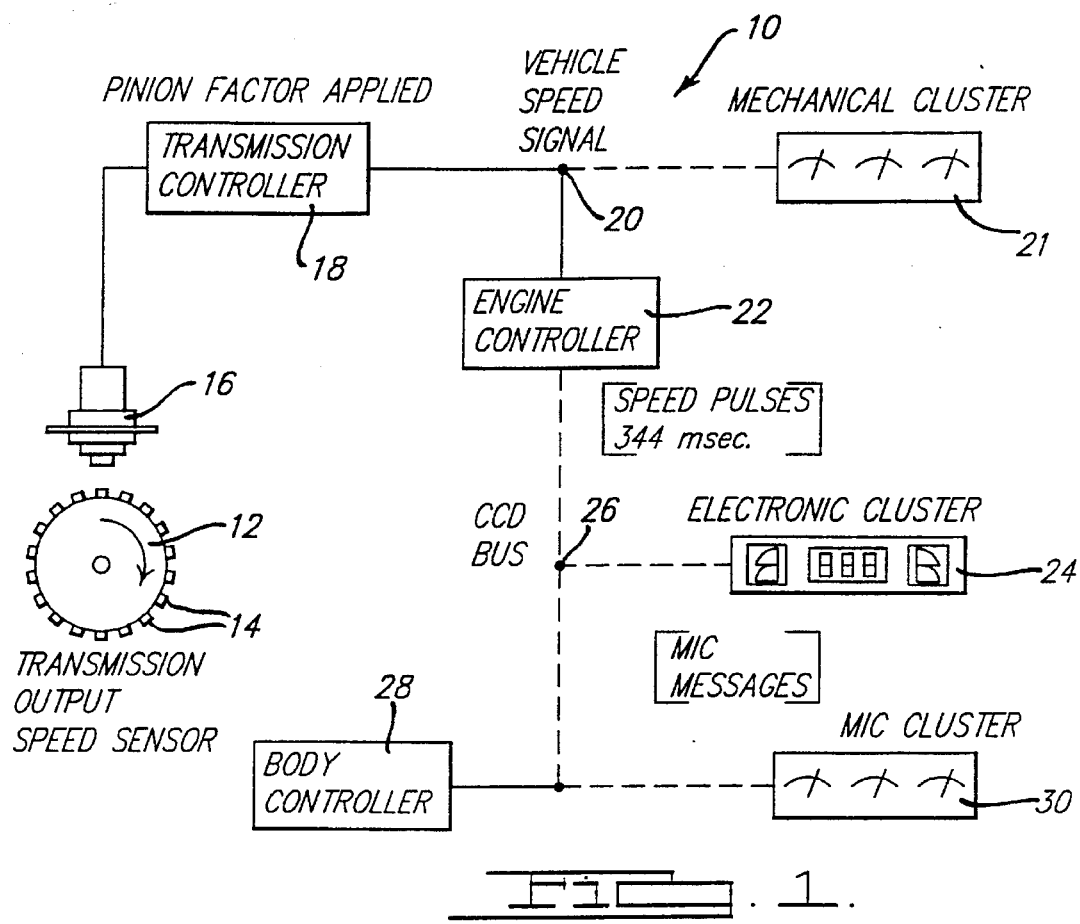
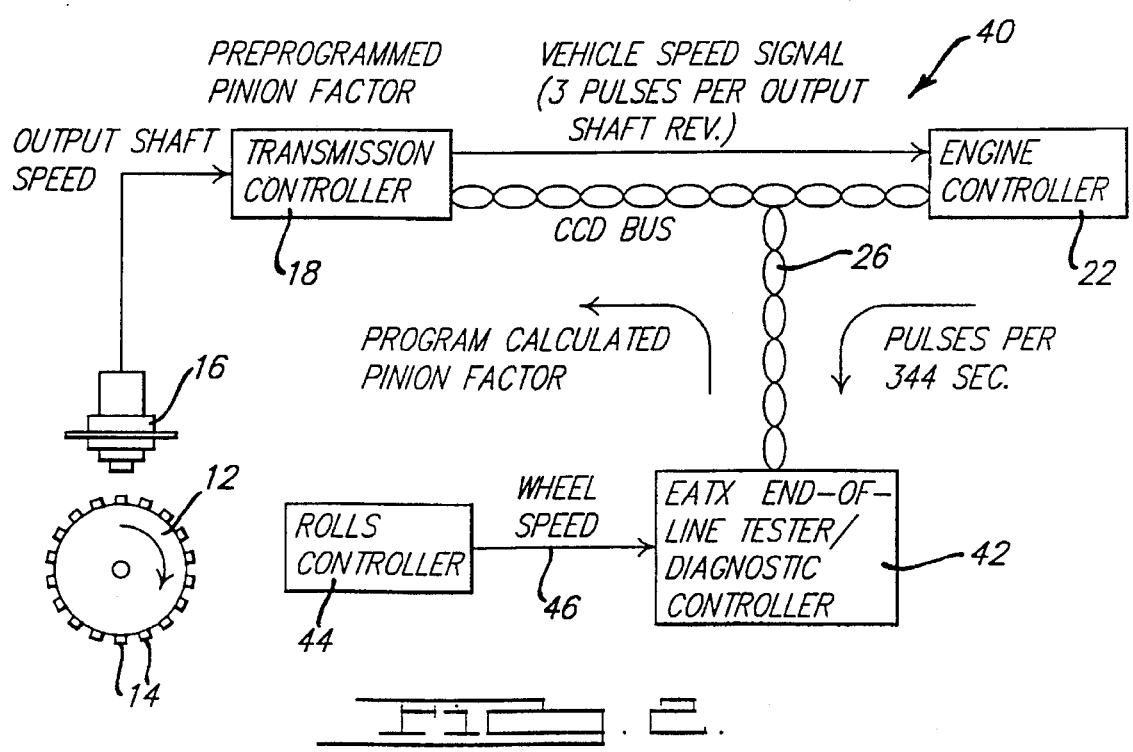

METHOD OF GENERATING AN OUTPUT SIGNAL REPRESENTING VEHICLE SPEED AND INDICATING SAME

This is a continuation of U.S. patent application Ser. No. 08/062,371, filed May 14, 1993 now abandoned.

BACKGROUND OF THE INVENTION

1. Field of the Invention

The present invention relates generally to speedometers for vehicles and, more particularly, to a method of selecting a pinion for a speedometer on an automotive vehicle.

2. Description of the Related Art

Currently, on front wheel drive automotive vehicles, vehicle speed information for a vehicle speedometer system is provided by a distance sensor (speed sensor) mounted in the extension housing of a transmission. The sensor is driven directly by a worm gear machined into the right driveshaft of the transmission and generates a predetermined number of pulses such as eight pulses per sensor shaft rotation. The desired distance signal of 8000 pulses per mile is achieved through the use of a plastic pinion gear on the sensor shaft. Pinion gears of varying tooth count are installed in assembly plants to compensate for different tire sizes and are selected based on the sales codes on the vehicle's build sheet.

The signal generated by the distance sensor is supplied to an engine controller and a mechanical instrument cluster (non serial data or CCD bus). The engine controller provides a count of speed pulses as a message on the CCD bus every 344 milliseconds. This message is utilized by body controllers, electronic instrument clusters, and other electronic modules in indicating or calculations using vehicle speed or distance traveled.

One disadvantage of the above is that a distance sensor and pinion gear are needed to provide vehicle speed information, resulting in increased cost to the vehicle. Another disadvantage is that several different sized pinion gears are needed to compensate for various tire sizes and the improper size pinion gear may be accidentally installed in the assembly plant.

SUMMARY OF THE INVENTION

It is, therefore, one object of the present invention to provide a method of selecting a pinion for a speedometer system on an automotive vehicle.

It is another object of the present invention to eliminate a distance or speed sensor and pinion gear to provide vehicle speed information.

It is yet another object of the present invention to utilize an output shaft speed sensor of a transmission on an automotive vehicle to provide vehicle speed information.

It is a further object of the present invention to utilize an electronic transmission controller and a transmission output shaft speed sensor to generate an output signal resembling the current distance or speed sensor signal.

To achieve the foregoing objects, the present invention is a method for selecting a pinion factor for a vehicle speedometer system. The method uses a transmission output speed sensor and a transmission controller which applies the selected pinion factors to the signal from the sensor to generate an output signal representing the speed of the vehicle.

One advantage of the present invention is that a method for selecting a pinion for supplying vehicle speed information is provided for a vehicle speedometer system on an automotive vehicle. Another advantage of the present invention is that the distance or speed sensor and pinion gear is eliminated for the vehicle speedometer system. Yet another advantage of the present invention is that the vehicle speedometer system uses a transmission output shaft speed sensor to provide vehicle speed information. A further advantage of the present invention is that an electronic transmission controller is utilized to apply a factor to the transmission output shaft speed sensor's signal and generate an output signal resembling the current distance or speed sensor signal. A still further advantage of the present invention is that the method of selecting a pinion to provide vehicle speed information reduces the cost of the vehicle by removing the distance sensor and pinion gear and increases the accuracy of the vehicle speed signal.

Other objects, features and advantages of the present invention are readily appreciated as the same becomes better understood after reading the subsequent description taken in conjunction with the accompanying drawings.

BRIEF DESCRIPTION OF THE DRAWINGS

FIG. 1 is schematic diagram of a vehicle speedometer system according to the present invention.

FIG. 2 is a schematic diagram of hardware used for performing a method of selecting a pinion, according to the present invention, for use in the vehicle speedometer system of FIG. 2.

DESCRIPTION OF THE PREFERRED EMBODIMENT(S)

Figure 3A:
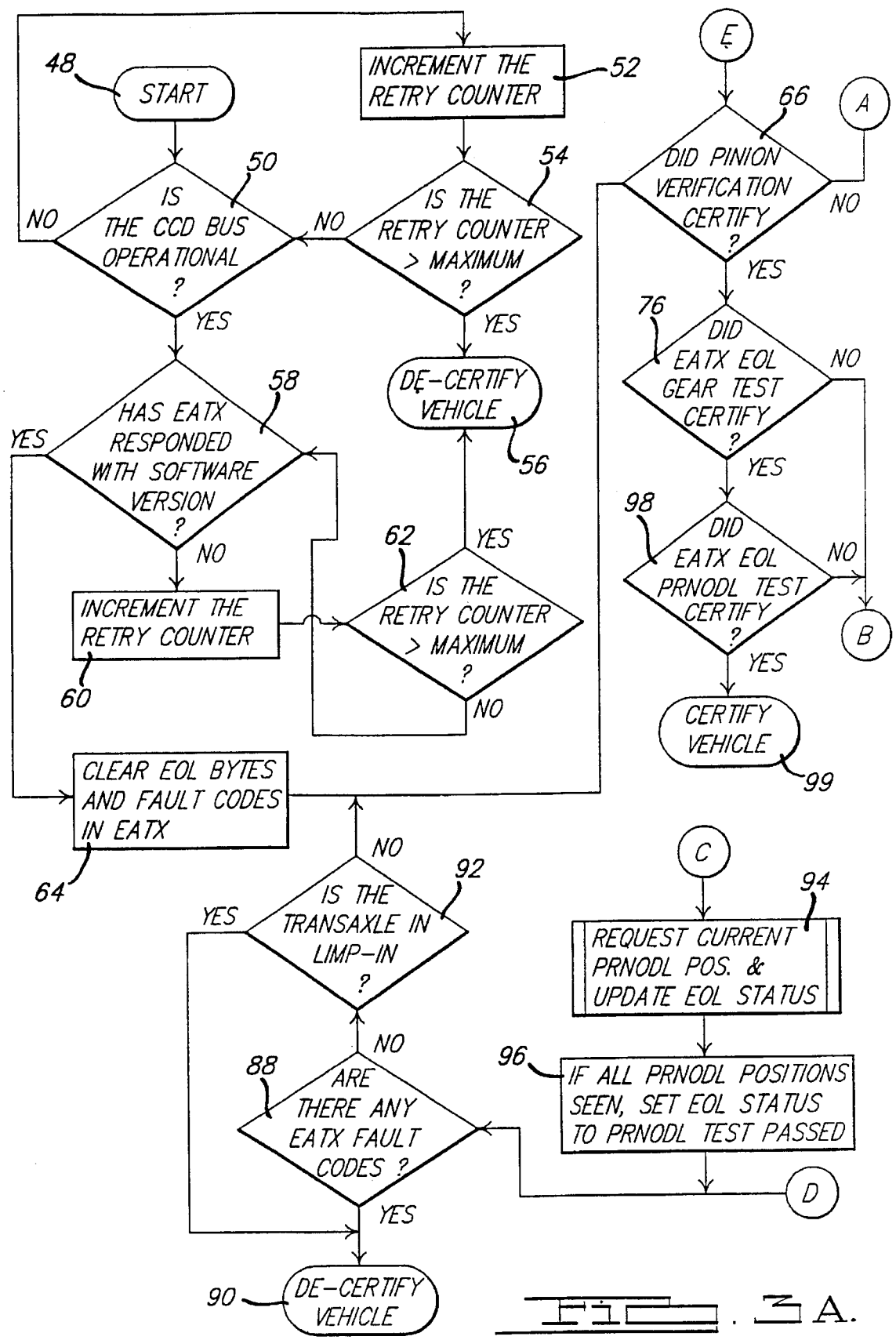
FIGS. 3A and 3B are flowcharts of a method of grading vehicles based on the pinion selected for the vehicle speedometer system of FIG. 1.

Referring to FIG. 1, a vehicle speedometer system 10, according to the present invention, is shown for an automotive vehicle (not shown). The system 10 includes a rotatable output member 12 of a transmission or transaxle (not shown). The output member 12 has a plurality of teeth 14 spaced circumferentially about the output member 12. The system 10 also includes an output speed sensor 16 mounted in a transmission case (not shown) of the transmission and disposed or radially spaced from the teeth 14. The system 10 further includes a transmission controller 18 connected to the output speed sensor 16 to provide a vehicle speed signal at 20. An example of an output member, output speed sensor and transmission controller are disclosed in U.S. Pat. No. 4,875,391 to Leising et al, the disclosure of which is hereby incorporated by reference. It should be appreciated that the output speed sensor 16 is located prior to the differential of the vehicle and its signal will not correspond to the actual speed of the vehicle.

The system 10 includes an engine controller 22 connected to the transmission controller 18, which receives the vehicle speed signal 20, to provide a predetermined number of speed pulses such as 344 msec. The system 10 includes an electronic instrument cluster 24 and a serial communications or data bus 26 connected to engine controller 22 utilizing the multiplexing protocol and interface technology of the Chrysler Collision Detection (CCD or C2D) Serial Data Bus described in U.S. Pat. Nos. 4,706,082; 4,719,458; 4,739,323; 4,739,324; and 4,742,349. The electronic instrument cluster 24 indicates the speed of the vehicle based on the number of speed pulses across the CCD bus 26 from the engine controller 22. It should be appreciated that the CCD bus 26 may also be connected to a body controller 28 and/or miscellaneous instrument cluster 30 which may utilize vehicle speed information. It should be appreciated that the system 10 may include a mechanical instrument cluster 21 connected to the transmission controller 18, which receives the vehicle speed signal 20, to indicate the speed of the vehicle.

Referring to FIG. 2, a schematic diagram of a pinion selection and verification system 40 is shown. The system 40 incorporates similar components of the system 10 and, as a result, like parts have like numerals. The system 40 includes a transmission end-of-line tester (diagnostic controller) or diagnostic readout box (DRB) 42 connected to the CCD bus 26. A description of the DRB 42 is disclosed in "DRB II Operator's Manual" by Chrysler Corporation Part No. CH1060 dated July 1989 and "1989 A-604 Four-Speed Electronic Automatic Transaxle Operation and Diagnostics" by Chrysler Corporation Master Tech dated July 1988, the disclosures of both are hereby incorporated by reference.

The system 40 also includes a rolls controller 44 which is connected to a chassis dynamometer rolls machine (not shown) to simulate a driving surface for the vehicle. The rolls controller 44 is connected to the DRB 42 by an electrical link 46 to provide actual vehicle or wheel speed to the DRB 42. It should be appreciated that the chassis dynamometer rolls machine is conventional and known in the art.

Figure 3B:
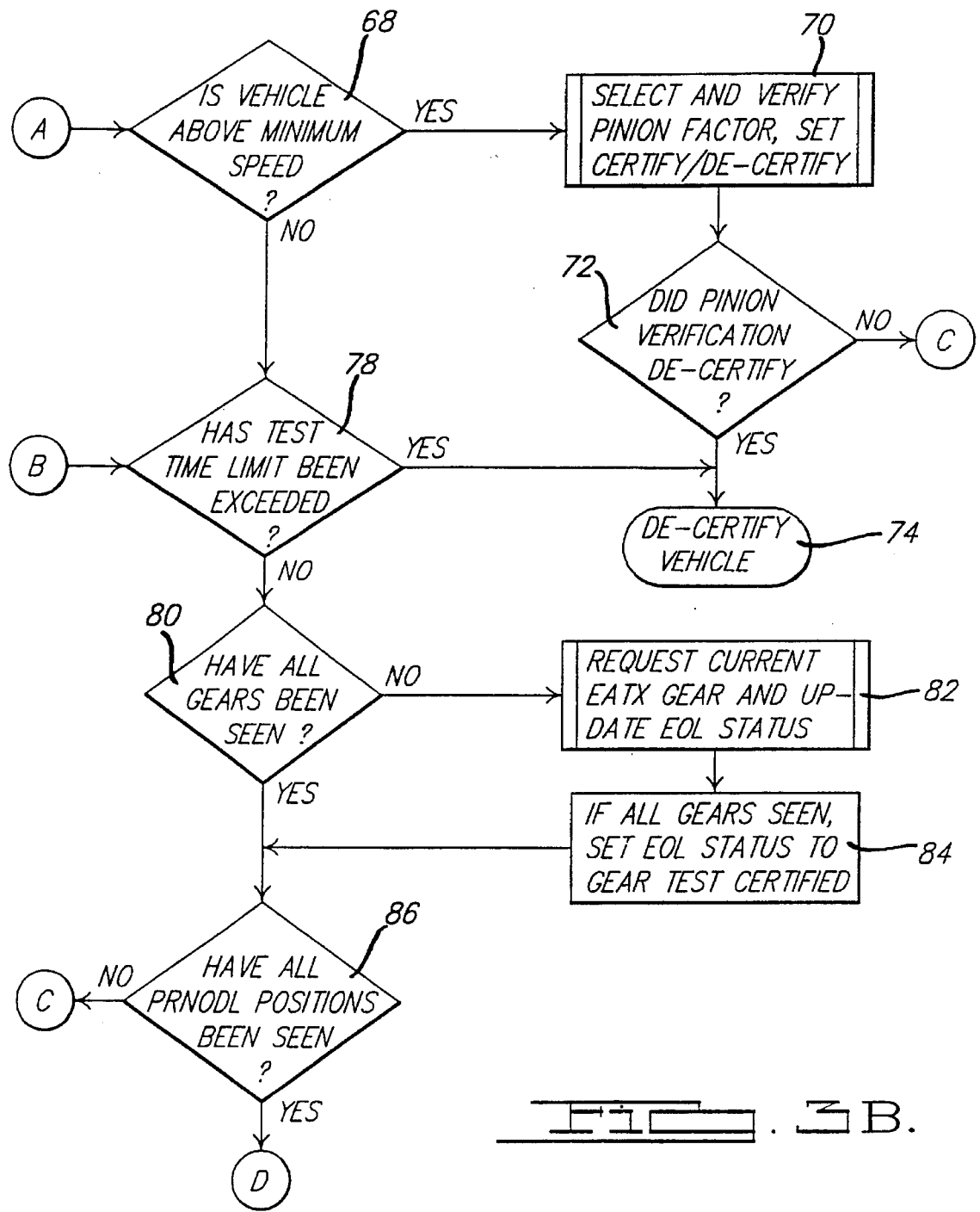

Referring to FIGS. 3A and 3B, a method of grading vehicles according to the pinion or pinion factor selected or applied for the vehicle speedometer system 10 is shown. The methodology starts or begins in bubble 48 and advances to diamond 50. In diamond 50, the methodology determines whether the CCD bus 26 is operational, for example, by the engine controller 22 sending out a signal and looking for a response. If not, the methodology advances to block 52 and increments a retry counter (not shown) in the engine controller 22 by a predetermined value such as one. The methodology then advances to diamond 54 and determines whether the count on the retry counter is greater than a predetermined maximum count such as two. If not, methodology advances to diamond 50 previously described. If so, the methodology advances to bubble 56 and de-certifies the vehicle by the engine controller 22.

In diamond 50, if the CCD bus 26 is operational, the methodology advances to diamond 58 and determines whether the transmission controller (EATX) 18 has responded, for example, by sending a request from the engine controller 22 to the transmission controller 18 and looking for a response. If not, the methodology advances to block 50 and increments the retry counter as previously described. The methodology then advances to diamond 62 and determines whether the count on the retry counter is greater than the predetermined maximum count as previously described. If so, the methodology advances to bubble 56 previously described.

In diamond 58, if the transmission controller 18 has responded, the methodology advances to block 64 and clears any end-of-line (EOL) bytes and fault codes in the transmission controller 18. The methodology then advances to diamond 66 and determines whether a pinion verification certified. If not, the methodology advances to diamond 68 and determines whether the vehicle is above a predetermined minimum speed inputted to the engine controller 22. If so, the methodology advances to block 70 and selects and verifies the pinion or pinion factor to be described in FIGS. 4A and 4B.

Figure 4A:
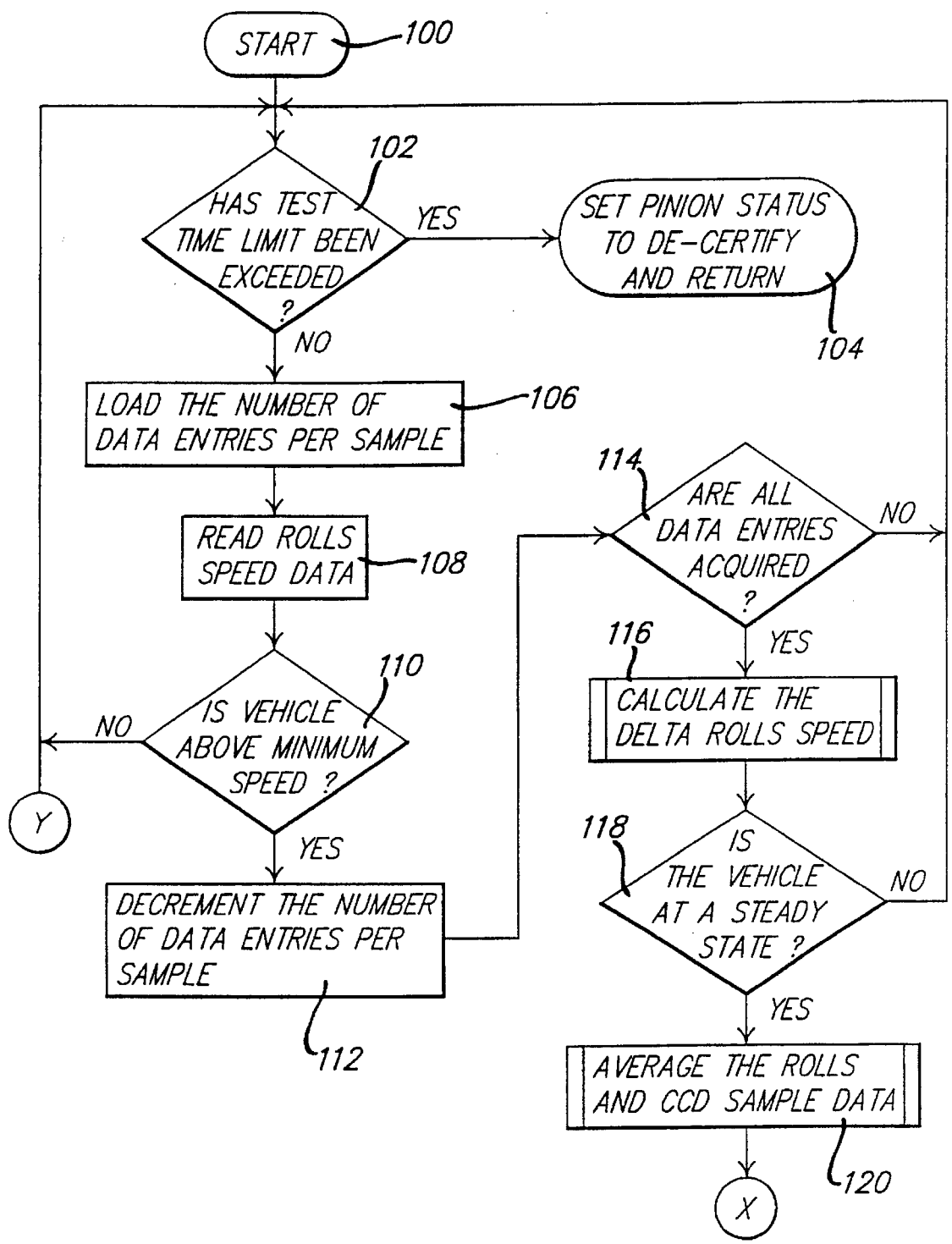
FIGS. 4A and 4B are flowcharts of a method of selecting a pinion, according to the present invention, for use with the hardware of FIG. 2.
Figure 4B:
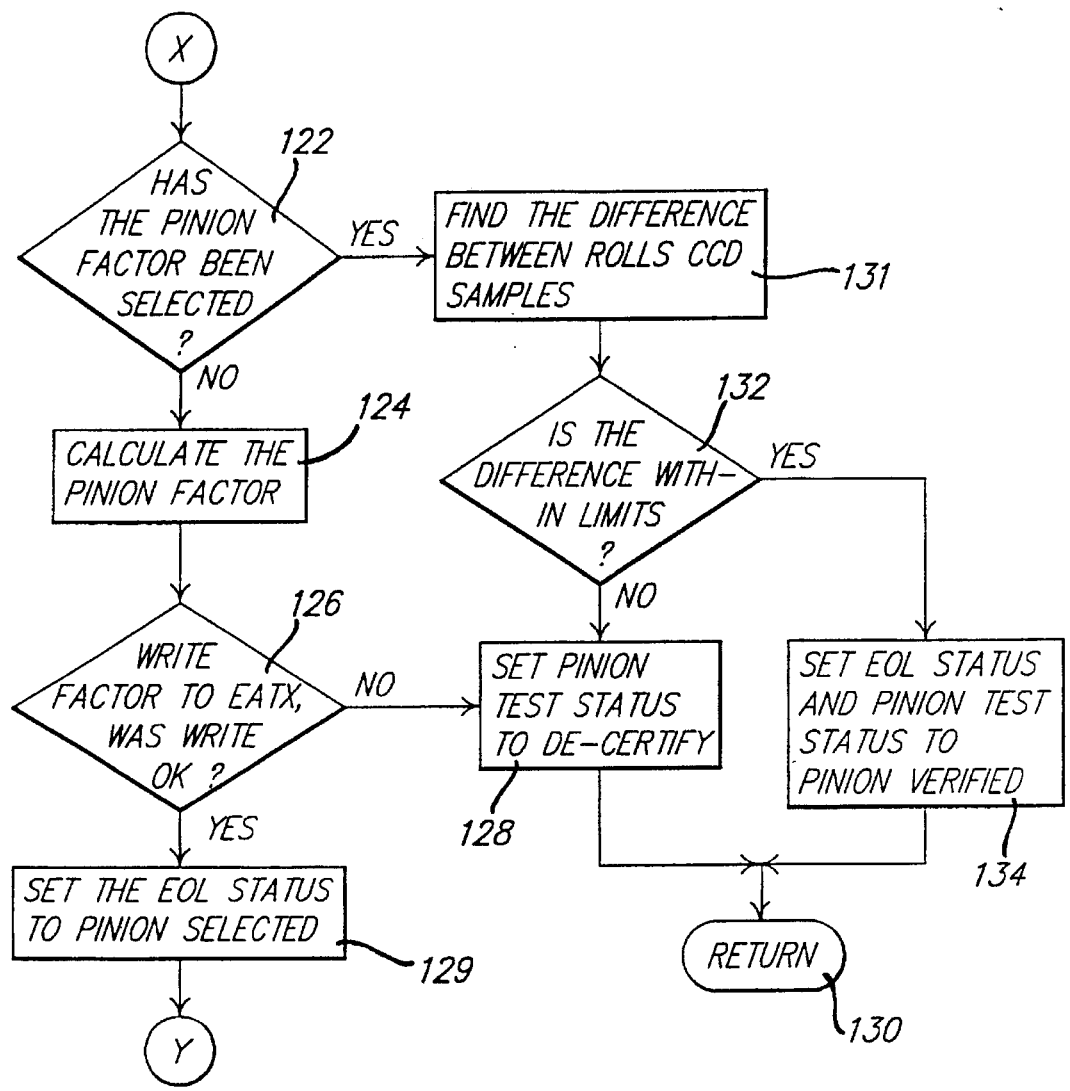

Referring to FIGS. 4A and 4B, the methodology for selecting and verifying a pinion factor of block 70 is shown for the pinion selection and verification system 40. The methodology begins or starts in bubble 100. From bubble 100, the methodology advances to diamond 102 and determines whether a predetermined test time limit has been exceeded. If so, the methodology sets a pinion status to de-certify and returns to block 70. If not, the methodology advances to block 106 and loads a predetermined number of data entries or pulses per sample or transmission output shaft revolution in the transmission controller 18 by the DRB 42. The methodology advances to block 108 and reads the roll speed data by the DRB 42 across the electrical link 46 from the rolls controller 44. The methodology advances to diamond 110 and determines whether the vehicle is above a predetermined minimum speed by comparing the rolls speed data which indicates actual vehicle speed to the minimum speed value.

If the vehicle is not above the minimum speed, the methodology advances to diamond 102 previously described. If the vehicle is above the minimum speed, the methodology advances to block 112 and decrements the number of data entries per sample. The methodology then advances to diamond 114 and determines whether all data entries are acquired, for example, by looking for a flag. If not, the methodology advances to diamond 102 previously described. If so, the methodology advances to block 116 to calculate a change in speed from the rolls controller 44.

From block 116, the methodology advances to diamond 118 and determines whether the vehicle is at steady state or constant speed. If not, the methodology advances to diamond 102 previously described. If so, the methodology advances to block 120 and averages the rolls speed data and CCD sample data from the engine controller 22. The methodology then advances to diamond 122 and determines whether the pinion factor has been selected. If not, the methodology advances to block 124 to calculate the pinion factor.

The DRB 42 receives information from two different sources, the rolls controller 44 and the engine controller 22. Each source sends information at different rates and asynchronously. The rolls controller 44 sends the speed of the vehicle wheels as they turn on the rolls machine via the link 46 every 300 milliseconds (msec). The engine controller 22 sends the number of vehicle speed pulses during the last 344 millisecond period, via the CCD Bus 26. The DRB 42 monitors both the link 46 and the CCD Bus 26, averages both sets of data and uses the averaged data for its calculations.

The DRB 42 uses two different formulas to select the correct pinion factor. The first formula calculates the default setting of the vehicle speed signal, while the second calculates the correct pinion factor.

To calculate the default setting of the vehicle speed signal, the formula is:

$$EATX \text{ factor} = \frac{8000 \, (a)}{(b) * 60 \, (c)} * 219.73 \, (d)$$

To calculate the correct vehicle speed signal for the vehicle the formula is:

$$EATX\ factor = \frac{CCD\ msg\ (e) * 2.907\ (f) * 3600\ (g) * 219.73\ (d)}{Vehicle\ speed\ (h) * (b)}$$

a = pulses/mile
b = desired pulses/transmission output shaft revolution
c = rpm/mph
d = EATX-II reduced formula for 50% duty cycle @4 microsecs per bit
e = transmission output shaft pulses per 344 milliseconds
f = CCD transmission output pulse messages/second
g = seconds/minute
h = Rolls vehicle speed in mph From block 124, the methodology advances to diamond 126 and writes the pinion factor calculated in block 124 to the transmission controller 18 and verifies whether it was okay or written. If not, the methodology advances to block 128 and sets the pinion test status to de-certify. The methodology then advances to bubble 130 and returns to block 70.

In diamond 126, if the write for the pinion factor was okay, the methodology advances to block 129 and set the EOL status to pinion selected. The methodology then advances to diamond 102 previously described.

In diamond 122, if the pinion factor has been selected, the methodology advances to block 131 and finds the difference between the rolls and CCD samples. The methodology advances to diamond 132 and determines whether the difference between the rolls and CCD samples is within a predetermined limit. If not, the methodology advances to block 128 previously described. If so, the methodology advances to block 134 and sets the EOL status and pinion test status to pinion verified. The methodology then returns through bubble 130 to block 70 of FIG. 3B.

To program the transmission controller 18, the DRB 42 writes the pinion factor into the EEPROM of the transmission controller 18. A total of five bytes are written, the pinion factor is a two byte value, the complement of the pinion factor is a two byte value, and the end-of-line (EOL) status is a one byte value.

The first step is to write the pinion factor, (the MS byte followed by the LS byte), then write the complement of the pinion factor, (MS byte followed by the LS byte). Once the LS byte of the complement is written, the correct pinion factor is used by the transmission controller 18 to output the speed sensor signal. The next step is to set a bit in the EOL status byte indicating that the pinion factor has been programmed. The last step is to verify the speed sensor signal is within specified limits and set a bit in the EOL status byte indicating that the pinion factor has been verified.

Returning to block 70, the methodology sets a certify/de-certify for the pinion verification. The methodology advances to diamond 72 and determines whether the pinion verification de-certified. If so, the methodology advances to bubble 74 and de-certifies the vehicle. If not, the methodology advances to diamond 66 previously described.

In diamond 66, if the pinion verification certified, the methodology advances to diamond 76 and determines whether the transmission controller EOL gear test certified. If not, the methodology advances to diamond 78 and determines whether the predetermined test time has been exceeded. If so, the methodology advances to bubble 74 previously described. If not, the methodology advances to diamond 80 and determines whether all gears of the transmission have been seen. If not, the methodology advances to block 82 and requests the current transmission gear from the transmission controller 18 and updates the EOL status. The methodology then advances to block 84 and if all transmission gears have been seen, sets the EOL status to gear test certified. The methodology then advances to diamond 86 and determines if all PRNODL positions have been seen. If so, the methodology advances to diamond 88 and determines whether there are any transmission fault codes. If so, the methodology advances to bubble 90 and de-certifies the vehicle. If not, the methodology advances to diamond 92 and determines whether the transmission is in limp-in, for example, by looking for a flag. If so, the methodology advances to bubble 90 previously described. If not, the methodology advances to diamond 66 previously described.

In diamond 86, if all PRNODL positions have not been seen, the methodology advances to block 94 and requests the current PRNODL position from the transmission controller 18 and updates the EOL status. The methodology then advances to block 96 and, if the PRNODL positions have been seen, sets EOL status to PRNODL test certified. The methodology then advances to diamond 88 previously described.

In diamond 76, if the transmission EOL gear test certified, the methodology advances to diamond 98 and determines whether the transmission EOL PRNODL test certified. If not, the methodology advances to diamond 78 previously described. If so, the methodology advances to bubble 99 and certifies the vehicle.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of generating an output signal representing the speed of a motor vehicle and indicating the speed, the motor vehicle having a vehicle speedometer system with an instrument cluster, a transmission having a transmission output member and an output speed sensor and a transmission controller, said method comprising the steps of:

sensing revolution of the transmission output member by the output speed sensor;

reading a signal of revolution of the transmission output member from the output speed sensor by the transmission controller;

sensing revolution of vehicle wheels by a dynamometer controller;

reading a signal of actual vehicle speed from the dynamometer controller;

calculating a pinion factor based on the signal of revolution of the transmission output member and the signal of actual vehicle speed; and applying the calculated pinion factor by the transmission controller to the signal from the output speed sensor and generating a vehicle speed output signal representing the vehicle speed and indicating the vehicle speed by the instrument cluster using the vehicle speed output signal.

2. A method as set forth in claim 1 including the step of verifying that the pinion factor is within a predetermined range of values by:

calculating a difference between the calculated vehicle speed and the actual vehicle speed;

if the difference is not within a predetermined range of values, setting a pinion status flag to fail; and if the difference is within the predetermined range, setting a pinion status flag to verified.

3. A method as set forth in claim 1 including the step of writing the pinion factor to a transmission controller by:

writing the pinion factor into a memory location within the transmission controller;

writing a compliment of the pinion factor into another memory location within the transmission controller; and setting an end of assembly line flag to pinion factor programmed.

4. A method as set forth in claim 1 wherein the dynamometer controller is a vehicle chassis dynamometer.

5. A method of generating an output signal representing the speed of a motor vehicle and indicating the speed, the motor vehicle having a vehicle speedometer system with an instrument cluster, a transmission with a transmission output member and an output speed sensor and a transmission controller, said method comprising the steps of:

sensing actual vehicle speed;

providing the sensed actual vehicle speed to a diagnostic controller;

sensing revolution of the transmission output member by the output speed sensor;

reading a signal of an actual number of pulses per revolution of the transmission output member using the transmission controller;

determining a pinion factor representing transmission output member revolutions per mile based on the actual number of pulses per revolution of the transmission output member divided by the actual vehicle speed;

programming the pinion factor into the transmission controller;

applying the determined pinion factor by the transmission controller to the signal from the transmission output speed sensor and generating a vehicle speed output signal representing the vehicle speed and indicating the vehicle speed by the instrument cluster using the vehicle speed output signal.

6. A method as set forth in claim 5 wherein said step of programming the transmission controller to provide a constant number of pulses per revolution of the transmission output member further comprises:

calculating a default pinion factor within the diagnostic controller using a fixed number of pulses per revolution of the transmission output member divided by a predetermined number of pulses per revolution of the transmission output member.

7. A method as set forth in claim 5 wherein said step of programming the pinion factor into the transmission controller includes:

writing the pinion factor into a memory location within the transmission controller;

writing a compliment of the pinion factor into another memory location within the transmission controller; and setting an end of assembly line flag to pinion factor programmed.

8. A method as set forth in claim 5 wherein said step of verifying the pinion factor includes:

calculating a difference between the calculated vehicle speed and the actual vehicle speed;

if the difference is not within a predetermined range, setting a pinion status flag to fail; and if the difference is within the predetermined range, setting a pinion status flag to verified.

9. A method as set forth in claim 5, wherein the diagnostic controller is a diagnostic readout box.

10. A method as set forth in claim 5 wherein actual vehicle speed is sensed using a vehicle chassis dynamometer.

11. A method of generating an output signal representing the speed of a motor vehicle and indicating the speed, the motor vehicle having a vehicle speedometer system with an instrument cluster, a transmission having a transmission output member and an output speed sensor and a transmission controller, said method comprising the steps of:

sensing revolution of the transmission output member by the output speed sensor;

reading a signal of revolution of the transmission output member from the output speed sensor by the transmission controller;

sensing actual vehicle speed;

reading a signal of actual vehicle speed from a dynamometer controller;

determining a pinion factor based on the signal of revolution of the transmission output member and the signal of actual vehicle speed; and applying the determined pinion factor by a transmission controller to the signal from the output speed sensor and generating a vehicle speed output signal representing the vehicle speed and indicating the vehicle speed by the instrument cluster using the vehicle speed output signal.

* * * * *